United States Patent
Ray

[15] 3,674,055
[45] July 4, 1972

[54] SEALING CONSTRUCTION FOR GAS MAINS AND THE LIKE

[72] Inventor: Charles W. Ray, 525 Stadium Drive, Fort Wayne, Ind. 46805

[22] Filed: Dec. 28, 1970

[21] Appl. No.: 101,555

[52] U.S. Cl. ................................. 138/89, 138/92, 220/24 A
[51] Int. Cl. ........................................................ F16l 55/10
[58] Field of Search ........................... 138/92, 89; 220/24 A

[56] References Cited

UNITED STATES PATENTS

| | | | |
|---|---|---|---|
| 2,155,491 | 4/1939 | Jacobs | 138/89 |
| 2,588,188 | 3/1952 | Weisman | 138/89 |
| 2,462,748 | 2/1949 | Johnson | 138/89 |
| 2,299,365 | 10/1942 | Valuch | 138/89 X |
| 2,482,687 | 9/1949 | Mueller | 138/89 |
| 1,997,878 | 4/1935 | Wagner | 138/89 X |
| 3,410,522 | 11/1968 | Daghe | 132/92 X |
| 2,107,315 | 2/1938 | Wainwright | 138/89 |

FOREIGN PATENTS OR APPLICATIONS

| | | | |
|---|---|---|---|
| 956,971 | 8/1949 | France | 138/89 |
| 115,169 | 5/1918 | Great Britain | 138/89 |

*Primary Examiner*—Herbert F. Ross
*Attorney*—John A. Young

[57] ABSTRACT

An improved plug for gas mains which consists of two resilient members carried by a threaded stem. A nut rotates on the end of the stem and draws the two resilient portions together, thus expanding them to make a sealing fit within an opening of the gas main.

8 Claims, 6 Drawing Figures

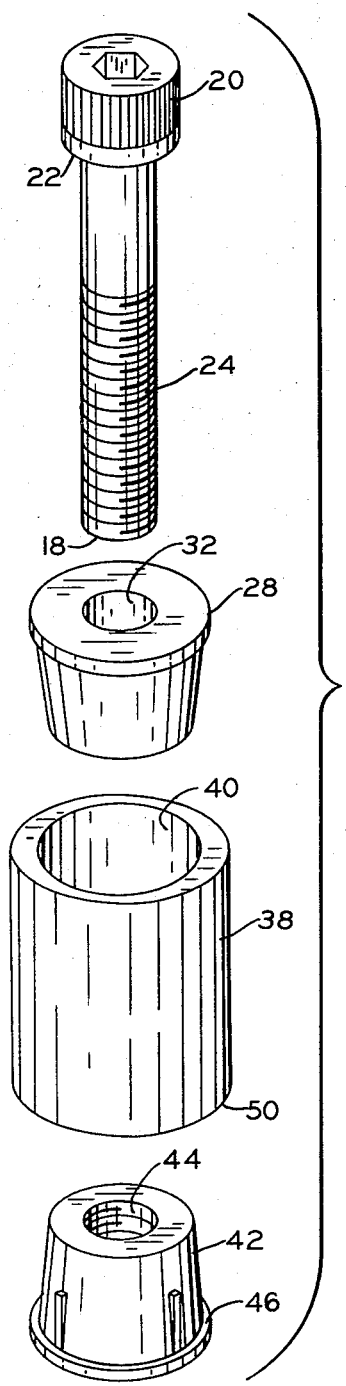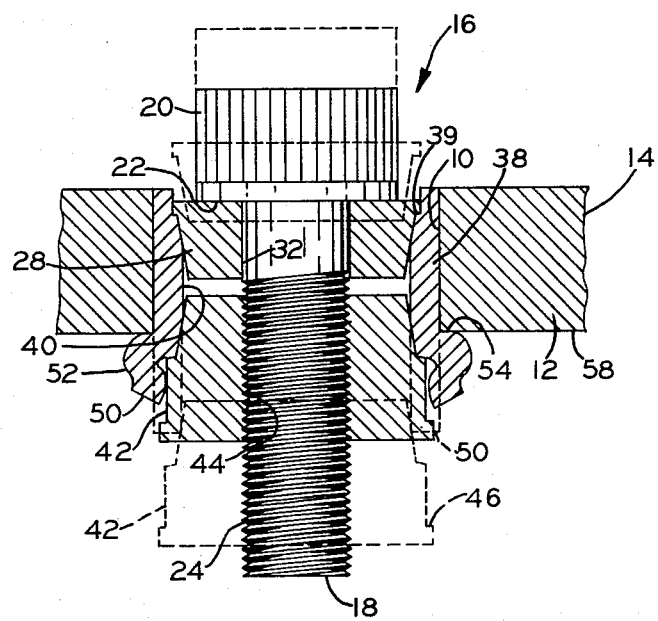
INVENTOR
CHARLES W. RAY
BY John a Young
ATTORNEY

PATENTED JUL 4 1972 3,674,055

INVENTOR
CHARLES W. RAY

BY *John A. Young*
ATTORNEY

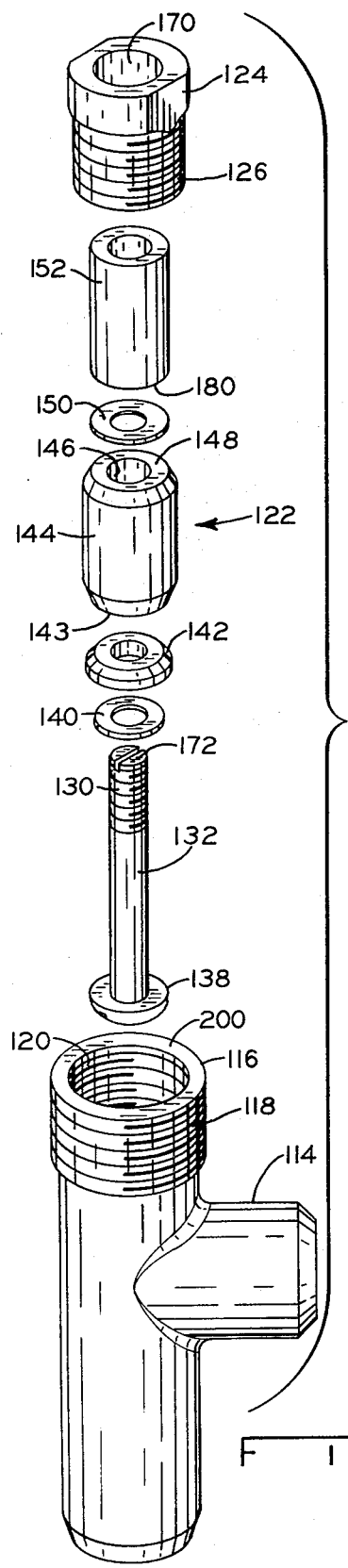
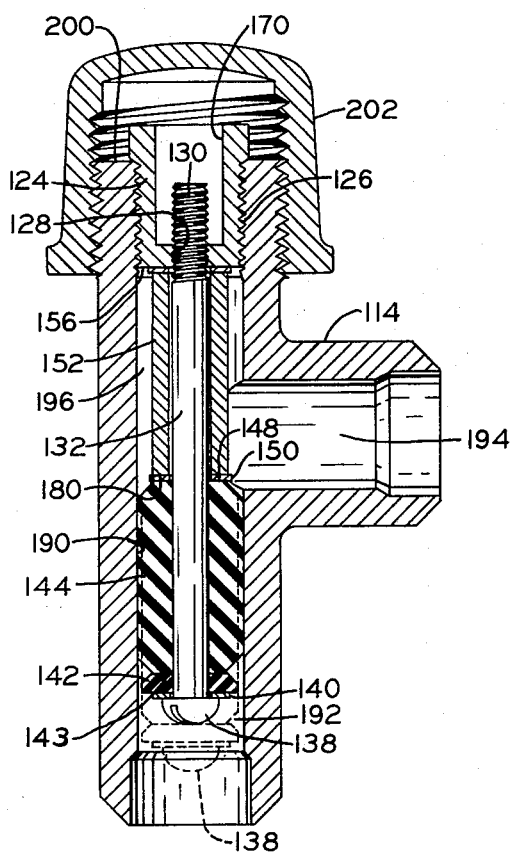
FIG. 5
FIG. 6
INVENTOR
CHARLES W. RAY
BY John A. Young
ATTORNEY

SEALING CONSTRUCTION FOR GAS MAINS AND THE LIKE

BACKGROUND OF THE INVENTION

It frequently happens that openings in gas mains must be sealed either during repair of the main or in sealing off an outlet from the main to a particular service outlet connection.

There are many occasions which require an effective use of a seal within gas mains and it is especially beneficial to be able to provide a so-called sacrificial seal where it is needed to produce a seal at a given location within a gas main and leave the seal either permanently or semi-permanently in place. For such a sealing arrangement to be practical it must be a relatively easy matter to install the seal at the given location, effect the seal within a relatively short time, and preferably while maintaining pressure within the gas main and then once the seal is attained it should be possible to leave the seal in place and to rely upon the sealing action indefinitely within the main. This is known as a sacrificial seal.

Most of the seals that have been proposed (and there are many) are expensive to provide and many of them also lack a reliability, which is absolutely essential, in effecting a seal of a gas main which carries inflammable or pollution-producing materials.

Obviously if the seal is not reliable, or is prone to develop leakages after a certain period of time, it is unacceptable and cannot be considered.

OBJECTS OF THE INVENTION

The principal object of the current invention is to produce a relatively inexpensive sacrificial seal which can be used for effecting seals at various locations in gas mains and the like and can be easily used by simply threading it in place to effect a reliable fitment within the gas main. The seal has a portion which is then easily manipulated to produce a blockage in such main at selected locations.

A further object of the present invention is to provide a new and improved seal which consists of a relatively few number of component parts and which, once installed, will be held reliably in place.

DESCRIPTION OF THE DRAWINGS

In the drawings:

FIG. 1 is an exploded isometric view of the seal prior to assembly thereof;

FIG. 2 is an enlarged sectional detail view of the seal illustrated in FIG. 1 after it is assembled within an opening in a gas main or the like;

FIG. 5 is an exploded view of a still further embodiment of my invention wherein a sacrificial seal is effected in a gas main over the cross section of the main; and, FIG. 6 is an enlarged sectional detail view of the seal illustrated in FIG. 5 after it is installed.

DETAILED DESCRIPTION OF THE INVENTION

Figure 3:
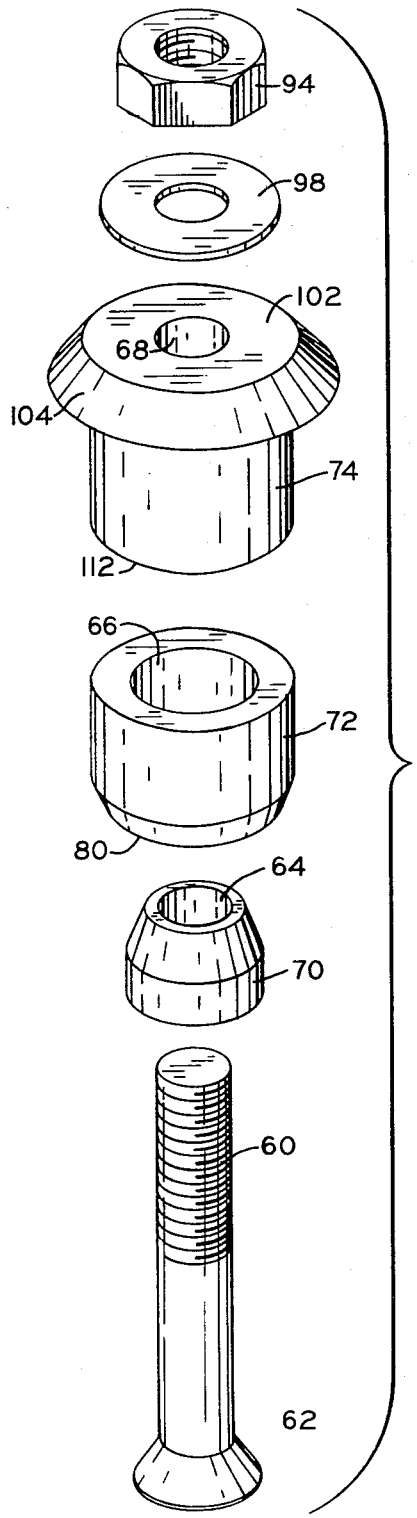
FIG. 3 is an exploded isometric view of a seal constituting a second embodiment of the invention.

Referring to FIGS. 1 and 2, an opening 10 in wall 12 of a gas main 14 is sealed by means of a seal designated generally by reference numeral 16. Seal assembly 16 includes a stem 18 with a cap end 20 having a shoulder 22 and a threaded section 24. Stem 18 passes through a frusto-conically shaped seal member 28. The seal member 28 has a centrally located opening 32 which is proportioned to receive the stem 18 therethrough. The seal is received within a deformable metal sleeve 38 having an opening 40 through which the stem 24 is also passed, and the sleeve 38 is proportioned to fit within opening 10 as indicated in FIG. 2 but is of greater length than the length of the opening 10. The seal member 28 fits within the sleeve 38 and is pressed against a seat 39 therein. A second sealing member 42 having a central threaded opening 44 and a shoulder 46 is threaded onto the stem 24 as indicated in FIG. 2 to serve as a clamping nut.

In order to effect a sealing of opening 10, the stem 18 is passed through the aligned openings 32, 40 and 44 of seal member 28, sleeve 38 and seal 42. The nut or seal 42 is then threadedly advanced on stem 24 so that the shoulder 46 will engage against and deform the open end 50 of the sleeve, causing it to be doubled inwardly upon itself to the configuration indicated by reference numeral 52 in FIG. 2.

In the process of foreshortening the sleeve 38, the end 50 is doubled inwardly upon itself to form an annular boss 54 which engages face 58 of wall 12, thus holding the sleeve 38 tightly in place against blowout under the influence of internal pressure within the main 12. The tapered walls of member 28 press against inclined complementary faces of sleeve 38 causing a wedging of the outer surface of sleeve 38 against the inner surface of the opening 10, thus tightly and sealingly holding the sleeve 38 in place. Leakage of gas is prevented between the contiguous, opposed sealing surfaces of the sleeve 38 and opening 10, and also between the contiguous surfaces of seal members 28, 42 and stem 18.

The seal, once it is in place, is tightly secured and is permanently affixed simply by turning down the head 20 and advancing the seal or nut 42 on the threaded portion 24 of the stem 18 until the sealing surfaces are tightly wedged in place as indicated in FIG. 2. No special tools are required to install the seal, conventional wrench, pliers, etc. generally available, are sufficient for installation purposes.

Figure 4:
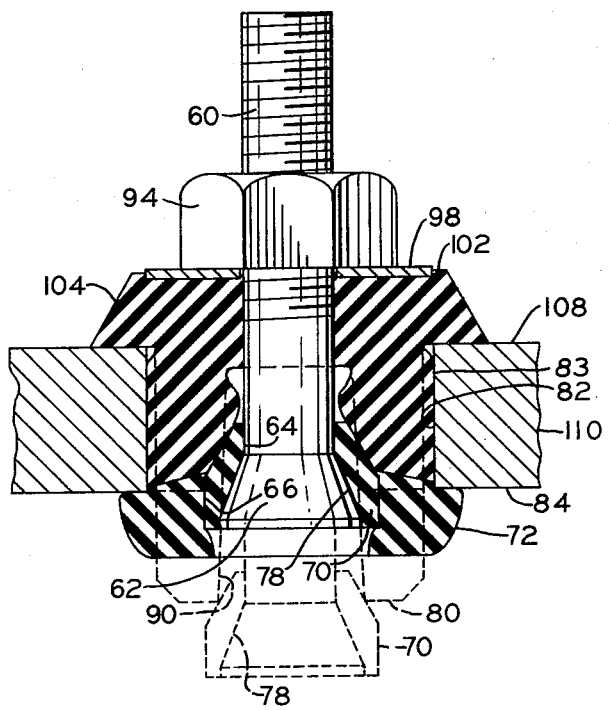
FIG. 4 is an enlarged sectional detail view of the seal illustrated in FIG. 3 after it is assembled within an opening of a gas main and intended to be sealed.

Referring next to the embodiment of FIGS. 3 and 4, a threaded stem 60 having a frusto-conical head 62 is passed through centrally aligned openings 64, 66 and 68 in a spreader member 70 and two sealing members 72 and 74. The head 62 fits within a companion seat 78 of spreader 70 which bears against end 80 of sealing member 72 causing it to spread outwardly and backwardly from the dotted line position shown in FIG. 4 to the full line position wherein it bears sealingly against the inner surface 82 of opening 83 and also against surface 84, effecting thereby a seal with both such surfaces.

The sealing action described arises by forcing the spreader 70 into the pocket 90 of seal 72 when nut 94 is threaded downwardly on threaded stem 60, thereby causing the washer 98 to bear against face 102 and causing the overlying lip 104 to bear against face 108 of main 110. The final sealing position for seal 74 is indicated in full line position in FIG. 4 having been deformed at that position by the squeezing action occurring by turning down the nut 94 and pulling the opposite faces 102 and 112 of the seal together. When expanded and in sealing condition as the seal 74 is indicated in full lines in FIG. 4, it is prevented from blowing out of the opening 82 because of the considerable quantity of material disposed one on each side of the opening and in engagement with opposite faces 84 and 108 of the main wall.

The seal may consist of any suitable resilient material which can be expanded under pressure and which is relatively weather resistant and deterioration resistant. Such elastomeric materials as chloroprene, GR-S rubber, etc. are acceptable materials of construction, depending upon the particular application.

Referring next to the embodiment illustrated in FIGS. 5 and 6 there is illustrated a tee 114 having an end 116 with exterior threaded section 118 and an internal threaded portion 120. The sacrificial plug designated generally by reference numeral 122 includes a threaded plug 124 having external threads 126 which are received in the threaded opening 120, and an internal threaded opening 128 (FIG. 6) wherein is received the threaded end 130 of a stem 132 which is carried by the plug 124. The stem 132 has a slotted shouldered end 138 against which abuts a washer 140, a grommet 142, and end 143 of an expandable seal 144 with a central opening 146 which passes over the stem. End 148 of the seal is held by a washer 150 and a spacer 152 is held fixed against a stop 156 provided by the end of plug 124. The stem 132 is rotated by means of a screwdriver or the like which is inserted through the socket end 170 of plug 124 and into the slot 172 to effect turning of the stem and foreshortening of the distance between the grommet 142 and end 180 of spacer sleeve 152. As the stem is thus backed out of the tee and the distance foreshortened as described, the resilient flexible seal 144 is expanded and is thereby compressed against the sidewall 190 of the tee, thus separating the portion 192 of the tee from portions 194 and 196.

Once the sacrificial seal is formed, the end 200 of the tee is covered by means of a cap 202 which is threaded onto the external threads 204 of the tee.

As described, once the sacrificial seal is assembled, it can be installed (completely externally of the tee) by simply inserting it and the seal completed within a relatively short period of time. Once the seal is effected, the seal is disposed permanently as an obstruction within the tee, preventing any communication of pressure therepast for as long as the squeezing or compression action is effected by the stem in the manner described.

One of the principal advantages of the present invention is that the sacrificial seal can be installed by a single simple operation of threading the mounting plug stem and seal in place, and then backing off the stem to swell the internal seal from the dotted position (indicated in FIG. 6) to the full line position. Sufficient compressive force can readily be had upon the seal by means of a simple screwdriver operation which can develop sufficient swelling force to produce a simple yet efficient and reliable seal, blocking out the entire cross section of the tee.

The sacrificial seal is a very economical construction, consisting as it does, of only a threaded plug, stem, spacer and seal, and yet it operates in a convenient and reliable manner.

It is well within the teaching of the present invention that the seal 144 be of any preferred dimensions and shape such as oblong, spherical or the like and the particulars of the composition of the seal are also variable, depending upon the application and materials to which the seal is exposed, as for example petroleum products, hydrocarbon fuels, carbon monoxide, corrosive gases and the like.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. A sacrificial seal adapted to be inserted within a portion of a pressure-containing gas main and the like comprising an externally threaded member adapted to be received within a companion threaded opening within a portion of the gas main, said threaded member having an external recess and an axially aligned threaded opening, a rigid inflexible stem including a threaded portion received in said threaded opening of said member and extending outwardly in said recess, said threaded portion of said stem configured to engageably receive a tool for effecting movement of said stem within said recess of said member, elongated spacer means to determine the depth at which the seal is to be effected and operatively bearing at one end thereof against said threaded member, a resilient expandable seal bearing at one end against said spacer means, means forming an abutment at the end of said stem and adapted to bear against said sealing member which is compressed against the complementary end of said spacer member, said resilient means being proportioned to fit within said main while the main is under pressure, said stem being movable to effect compression of said seal against the end of said spacer means to form a seal within the main while the main is under pressure to produce a seal which is mechanically held in place through said spacer means and said threaded member and is permanently joinable to said main.

2. A sacrificial seal for fluid pressure containing conduits such as gas mains and the like in accordance with claim 1 wherein, said expandable seal is a relatively soft resilient plug operatively carried by said stem and expanded by compression to provide an internal seal within said gas main.

3. The sacrificial seal, in accordance with claim 1, including a cap having a threaded connection with an externally threaded open end of said main to effect a covering of the end of the main wherein said seal is mounted.

4. The seal, in accordance with claim 1, wherein the end of said stem is slotted and is operator accessible to provide turning of said stem and movement thereof relatively to said threaded member whereby said seal is expanded.

5. The seal in accordance with claim 1, wherein said seal is elongated and relatively narrow and has an opening through which said stem is passed and is carried by said stem.

6. A sacrificial seal in accordance with claim 1 wherein said resilient seal is captured on said stem whereby said elongated member when backed out relatively to said threaded member will effect compression and thereby expansion of said resilient means.

7. The sacrificial seal in accordance with claim 6 wherein said stem includes operative means adapted to provide turning thereof exteriorly of said gas main to obtain expansion of said resilient seal.

8. The sacrificial seal in accordance with claim 6 wherein said elongated member compresses said resilient seal against an abutment provided on said stem to provide a foreshortening of said resilient means and consequent expansion thereof.

* * * * *